United States Patent
Hoover

(10) Patent No.: US 10,723,561 B1
(45) Date of Patent: Jul. 28, 2020

(54) TOOL-FREE BELT AND CONVEYOR COMPONENT COVER AND ACCESS HOOD

(71) Applicant: Shawn Michael Hoover, Mayfield, KY (US)

(72) Inventor: Shawn Michael Hoover, Mayfield, KY (US)

( * ) Notice: Subject to any disclaimer, the term of this patent is extended or adjusted under 35 U.S.C. 154(b) by 0 days.

(21) Appl. No.: 16/674,712

(22) Filed: Nov. 5, 2019

(51) Int. Cl.
*B65G 21/10* (2006.01)
*B65G 21/08* (2006.01)
*F16B 2/18* (2006.01)

(52) U.S. Cl.
CPC ............. *B65G 21/10* (2013.01); *B65G 21/08* (2013.01); *F16B 2/18* (2013.01)

(58) Field of Classification Search
CPC ............ B65G 21/08; B65G 21/10; F16B 2/18
USPC .......................................... 198/860.3, 860.5
See application file for complete search history.

(56) References Cited

U.S. PATENT DOCUMENTS

| | | | |
|---|---|---|---|
| 2,038,471 A | 4/1936 | Benatar | |
| 2,644,572 A | 7/1953 | Mercier | |
| 2,656,036 A | 10/1953 | Whitney | |
| 2,896,291 A * | 7/1959 | Gidlow | F16B 5/06 24/457 |
| 2,955,702 A | 10/1960 | Long | |
| 3,147,852 A | 9/1964 | Hanson, Jr. | |
| 3,721,363 A * | 3/1973 | Bressler | F16J 13/06 220/315 |
| 3,856,135 A * | 12/1974 | Hayakawa | B65G 21/08 198/860.5 |
| 3,878,936 A | 4/1975 | Niggemyer | |
| 4,090,604 A * | 5/1978 | Reifert | B65D 90/54 198/860.5 |
| 4,093,066 A | 6/1978 | Mitchell et al. | |
| 4,320,825 A | 3/1982 | Buschbom et al. | |
| 4,436,446 A | 3/1984 | Gordon | |
| 4,714,151 A | 12/1987 | Campbell et al. | |
| 4,846,580 A * | 7/1989 | Oury | B28C 9/00 366/27 |
| 5,774,951 A | 7/1998 | Close et al. | |
| 5,931,288 A | 8/1999 | Avery | |
| 6,626,285 B2 | 9/2003 | Enomoto | |
| 7,743,914 B2 | 6/2010 | Nagahama et al. | |
| 7,886,897 B2 | 2/2011 | Johanssen | |
| 8,047,358 B1 | 11/2011 | Marcks | |
| 8,414,061 B1 * | 4/2013 | Greminger | B60P 1/42 150/154 |
| 9,580,946 B2 * | 2/2017 | Schinkowsky | E05C 19/12 |
| 2005/0178643 A1 | 8/2005 | Simoens et al. | |

* cited by examiner

*Primary Examiner* — James R Bidwell
(74) *Attorney, Agent, or Firm* — Dunlap, Bennett & Ludwig PLLC

(57) ABSTRACT

An access hood assembly for a conveyor cover is provided. The access hood assembly embodies a cammed lock assembly at each corner, for easier and safer opening, with no tools required, wherein each cammed lock assembly can act to lock the hood or as a pivot point to pivot about to an open position, when the hood is opened from the opposing side, where the associated cammed lock assemblies have been moved to an unlocked position. The arcuate hood of the access hood assembly supports multiple connection points for each cammed lock assembly to engaged in a locked position for securely keeping the access hood propped open when desired.

7 Claims, 5 Drawing Sheets

TOOL-FREE BELT AND CONVEYOR COMPONENT COVER AND ACCESS HOOD

BACKGROUND OF THE INVENTION

The present invention relates to conveyor covers for and, more particularly, to an access hood for a conveyor belt.

Conveyors are used for conveying various materials from point A to point B and beyond. Along the way, the conveyor may be at elevations significantly above the supporting surface for a worker interested in accessing the conveyor. Typically, conveyors have covers to prevent said materials from falling off the conveyor or said material from being contaminated from other external substances. As a result, such access is through an openable portion of the cover, typically called a hood or guard.

Currently, opening conveyor hoods require the use of tools. And since this operation may be done at heights, if the required tooling is dropped when attempting to open the hood, the access process can be detrimentally prolonged (and the dropped tools can cause injury to others or damage to machinery). Additionally, tools can scratch the hood and or surrounding cover, thus posing a separate issue, as current covers will rust if scratched. Finally, openable hoods for conveyor covers currently have the tendency to jolt open, thus they can hit the person opening it, further increasing the possibility of losing the associated tools or hardware, such as the hood or guard itself, which can also threaten to injure others or damage surrounding equipment.

As can be seen, there is a need for an access hood for a conveyor cover. The conveyor cover hood embodied in the present invention requires no tools to open, is rust-proof, and opens in a less jolty fashion through cam-sliding action, improving the safety and ease of accessing the conveyor underneath the cover, while maintaining the structural strength of the cover.

SUMMARY OF THE INVENTION

In one aspect of the present invention, a cover hood assembly including the following: two spaced apart arcuate frames; each arcuate frame having a circumferential ridge facing the other circumferential ridge; a plurality of attachment points spaced apart along a circumference of each arcuate frame just inward of the circumferential ridge; an arcuate hood having a greater radius than a radius of each arcuate frame; a cover lock assembly attached to each corner of the arcuate hood; and each cover lock assembly having a cam bolt latch engaged with two spaced apart bolt posts, the two spaced apart bolt posts attached to the corner so that the cam bolt latch is movable between an unlocked position and a locked position engaging an adjacent attachment point of the plurality of attachment points; a bolt arm extending from a bolt body of the cam bolt latch; the cam bolt latch rotatable within the engaged two spaced apart bolt posts so that the bolt arm is rotatable between a secured and unsecured position; for each cover lock assembly: two spaced apart clevis posts between the two spaced apart bolt posts so as to be below said bolt body; and a clevis removably interconnecting the two spaced apart clevis posts for preventing the bolt arm from rotating between the secured and unsecured position; further including a Z-shaped pin extending from each bolt body, the Z-shaped pin engaging the adjacent attachment point of the plurality of attachment points in the locked position, wherein said adjacent attachment is spaced away from the arcuate hood a distance farther than a distal boundary of the circumferential ridge, and wherein the bolt body generally abuts said distal boundary when the bolt arm is in the secured position; a handle attached to each longitudinal edge of the arcuate hood, wherein the arcuate hood is pivotably engaged relative to each cover lock assembly in the locked position, and wherein the unlocked position the Z-shaped pin prevents the cam bolt latch from sliding past the circumferential ridge.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an access hood assembly for a conveyor cover that incorporates higher quality corrosion resistant materials, such as stainless steel and flexible UV resistant PVC. The access hood assembly employs a cammed lock assembly one each corner of an arcuate hood for easier and safer opening thereof, with no tools required. The cammed lock assembly is movable between a locked and unlocked position. In the locked position, the cammed lock assembly acts to lock the hood or enable a pivot point to pivotably open the arcuate hood from the opposing side, wherein the associated cammed lock assemblies are in the unlocked position. Along the arcuate hood, multiple attachment points may be provided for removably locking the arcuate hood in an opposed position for facilitating access.

Figure 1:
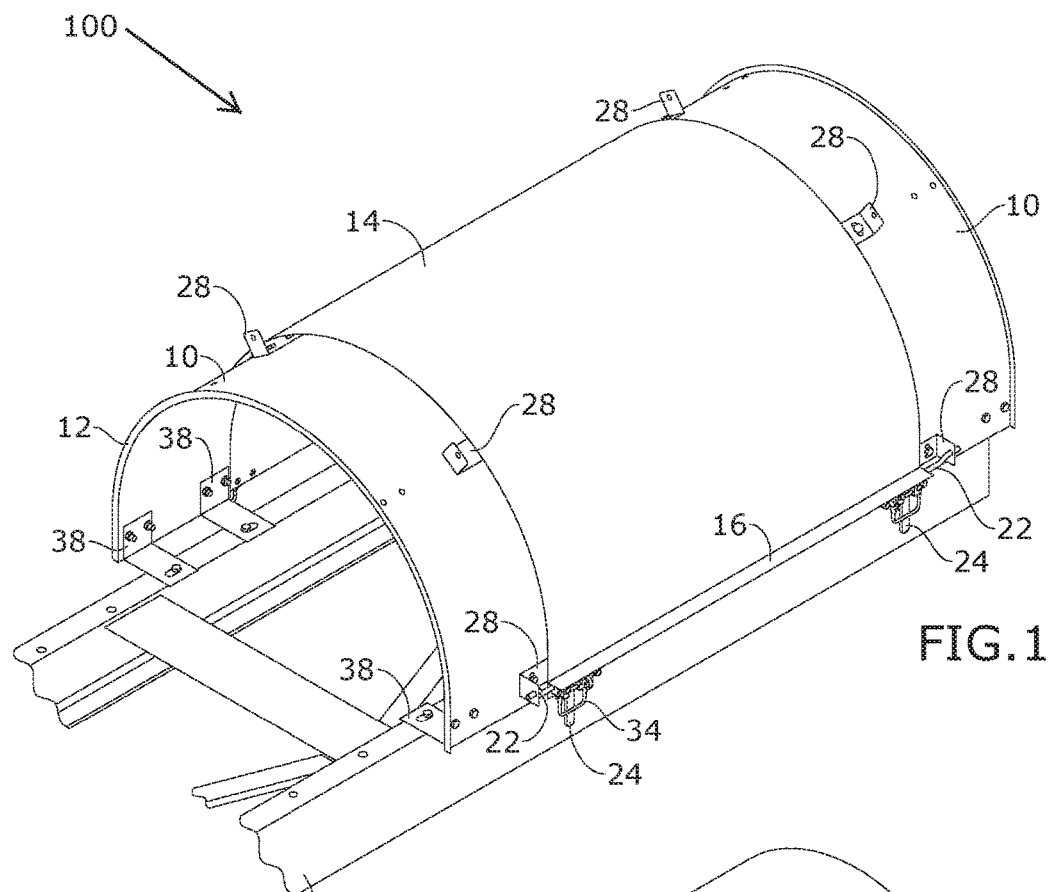
FIG. 1 is a perspective view of an exemplary embodiment of the present invention, shown installed and in a closed position.

Referring to FIGS. 1 through 9, the present invention may include a conveyor cover hood assembly 100 having two spaced apart arcuate frame elements 10, each arcuate frame element 10 may be joined to base framing 48 of the conveyor (or other covered equipment) by way of fasteners 38, such as anchor brackets. Each arcuate frame element 10 may have longitudinal ridges 12 as shown in FIG. 1, and just inward of an inner longitudinal ridge 12 of each arcuate frame element 10 may be a plurality of latch brackets 28. The plurality of latch brackets 28 are spaced apart in alignment with latch brackets 28 on the same arcuate frame element 10 and in alignment with latch brackets spaced apart along the circumference of the opposing arcuate frame element 10, as illustrated in FIG. 1. An arcuate hood 14 has a length that extends between the opposing, aligned plurality of latch brackets 28 of each arcuate frame element 10. The arcuate hood 14 may have a transversely oriented hood handle 16 at each longitudinal edge, as illustrated in the FIGS. Adjacent to each end of the hood handles 16 and/or each corner of the arcuate hood 14, a locking assembly 200 may be disposed.

Each locking assembly 200 may include a cam z-bolt 22 movable between an unlocked position and a locked position, wherein the Z-shaped cammed bolt latch pin 26 of the cam z-bolt 22 slidably engages a z-bolt hole 30 disposed in an associated latch bracket 28. The body of the cam z-bolt 22 engages the longitudinal ridge 12 of the associated arcuate frame element 10, and said body has a bolt arm 24 extending therefrom for facilitating the moving between the unlocked and locked positions.

The body of the z-bolt 22 is supported by two spaced apart z-bolt receiving posts 18 attached to a lower corner of the arcuate hood 14. Each z-bolt receiving post 18 provides a z-bolt post hole that the z-bolt 22 slidably engages when moving between the locked and unlocked position. When the z-bolt 22 is in the locked position, the bolt arm 24 may rotate between an unsecured position and a secured position where the bolt arm 24 is in a downward orientation.

It should be understood by those skilled in the art that the use of directional terms such as upper, upward, lower, downwardly, top and the like are used in relation to the illustrative embodiments as they are depicted in the figures, the upward direction being toward the top of the corresponding figures and a downward direction being toward the bottom of the corresponding figures.

Between the two spaced apart z-bolt receiving posts 18, beneath the aligned z-bolt post holes of the z-bolt receiving posts 18, two spaced apart clevis receiving posts 20 are attached to the arcuate hood 14. The distance the two clevis receiving posts 20 are spaced apart is at least far enough to allow the bolt arm 24 to be in the downward orientation therebetween, in the secured position.

Each clevis receiving post 20 provides a clevis post hole that a clevis pin 32 slidably engages when moving between a pinned and an unpinned position. The clevis pin 32 may include a clevis arm 34 and clevis retaining cable 36, so that the clevis pin 32 is secured to the locking assembly 20 by way of the retaining cable 36, which in turn is attached to the clevis 34, for locking the clevis pin 32 in the pinned position and sheathing the clevis pin 32 when in the unpinned position. In the pinned position, the clevis pin 32 is received through both clevis post holes, preventing the bolt arm 24 in the secured position from rotating to the unsecured position, and in turn preventing the z-bolt 22 from sliding to the unlocked position. In the unsecured position, the body of the z-bolt 22 is above and clear of the clevis post holes and so can freely slide away from the locked position to the unlocked position disengaging from the z-bolt hole/attachment 30.

The z-bolt receiving posts 18 and clevis receiving posts 20 may be attached to the arcuate hood 14 by way of fasteners 40, 42, 44, and 46.

The arcuate hood 14 because of its curvature, the complementary curvature of the arcuate frames 10, and the cammed nature of the cam z-bolt/z-bolt post hole slidable engagement, can pivot upward or downward relative to a side of the base framing 48 about the cam z-bolt in the locked (and secured) position.

Figure 2:
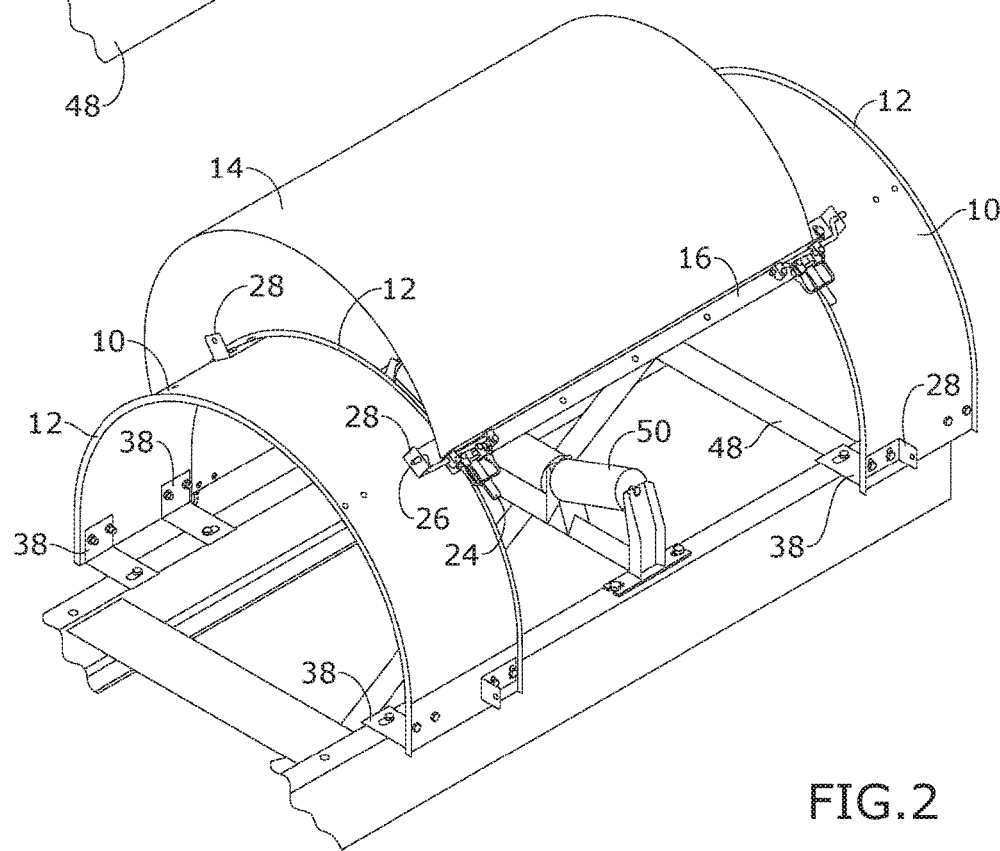
FIG. 2 is a perspective view of an exemplary embodiment of the present invention, shown in an open position.
Figure 3:
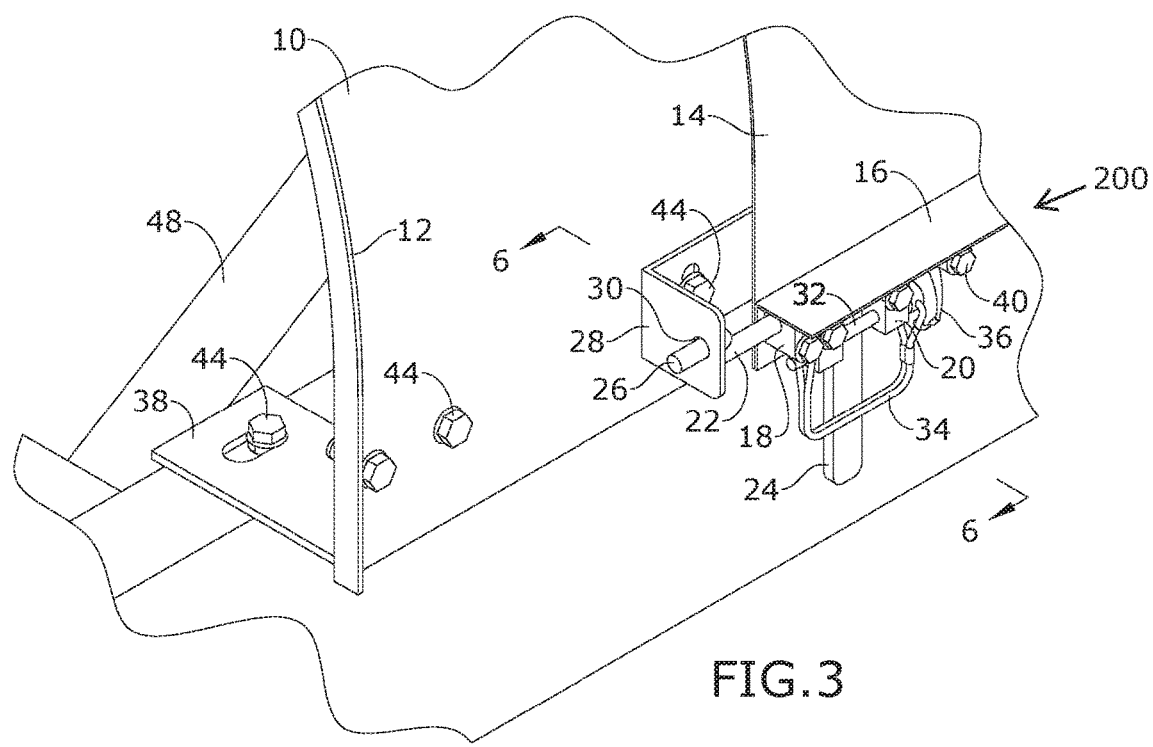
FIG. 3 is a detailed top perspective view of an exemplary embodiment of the present invention.
Figure 4:
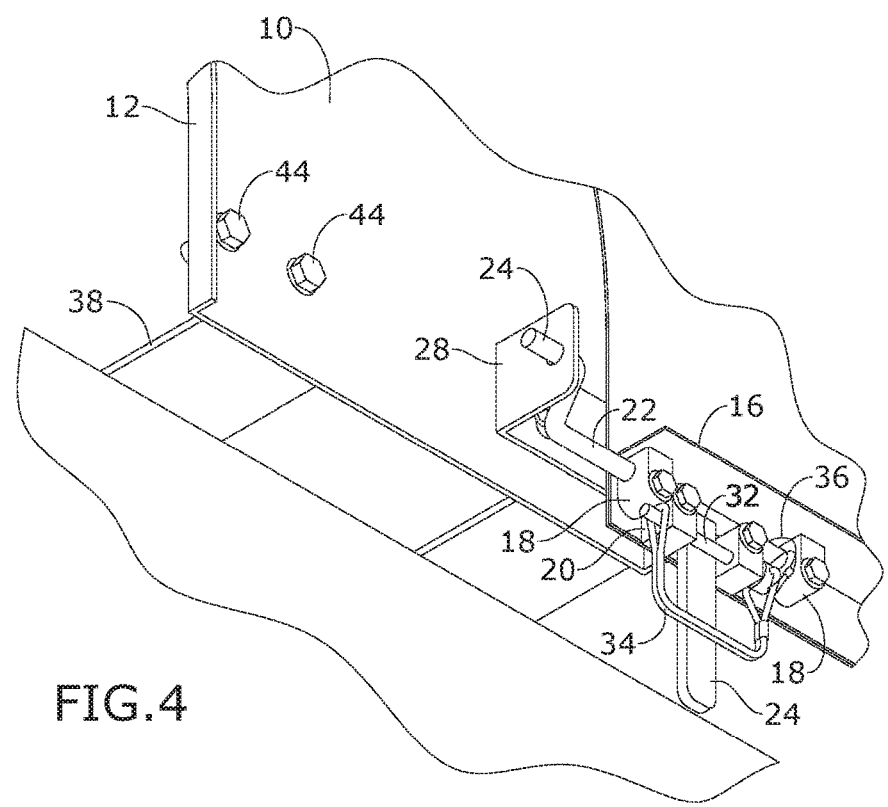
FIG. 4 is a detailed bottom perspective view of an exemplary embodiment of the present invention.
Figure 5:
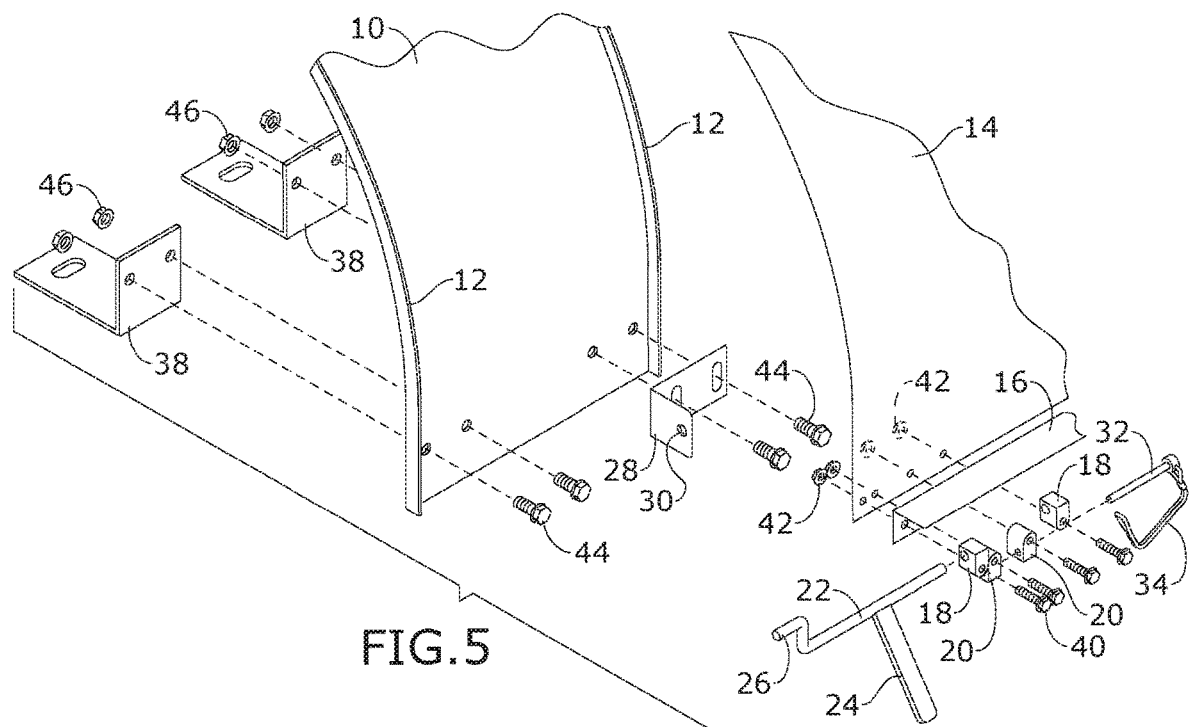
FIG. 5 is a detailed exploded view of an exemplary embodiment of the present invention, with cable 34 not shown for clarity.
Figure 6:
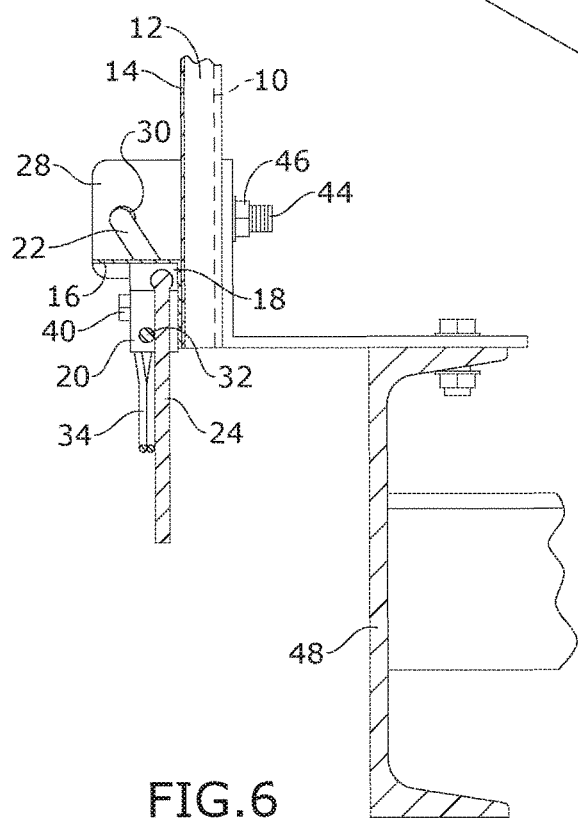
FIG. 6 is a section view of an exemplary embodiment of the present invention, taken along line 6-6 of FIG. 3.
Figure 7:
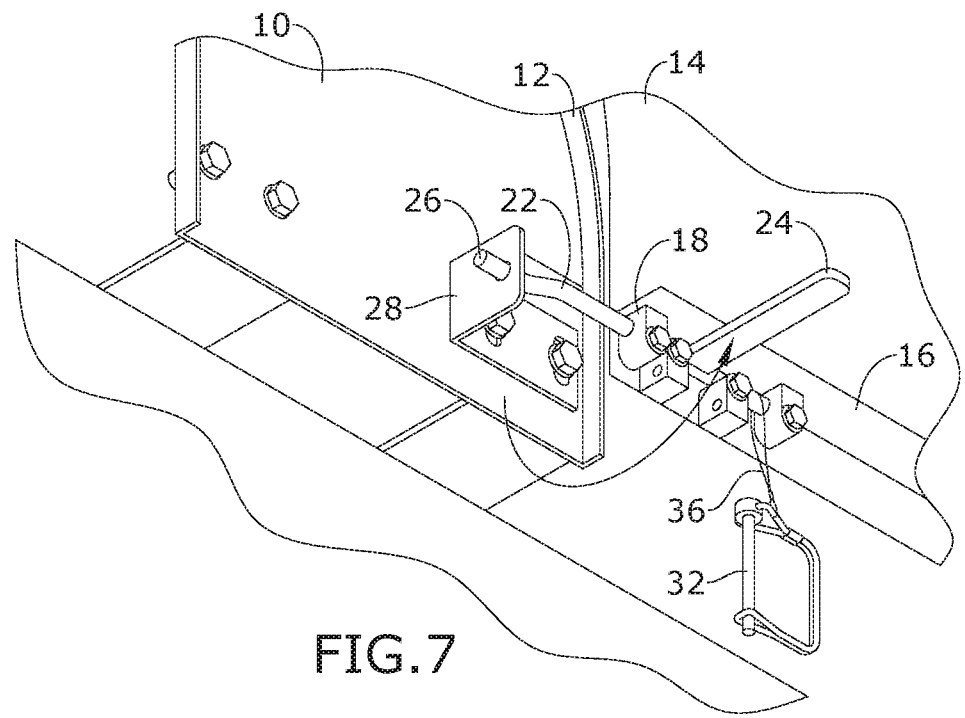
FIG. 7 is a detail bottom perspective view of an exemplary embodiment of the present invention, illustrating the raising of bolt arm 24.
Figure 8:
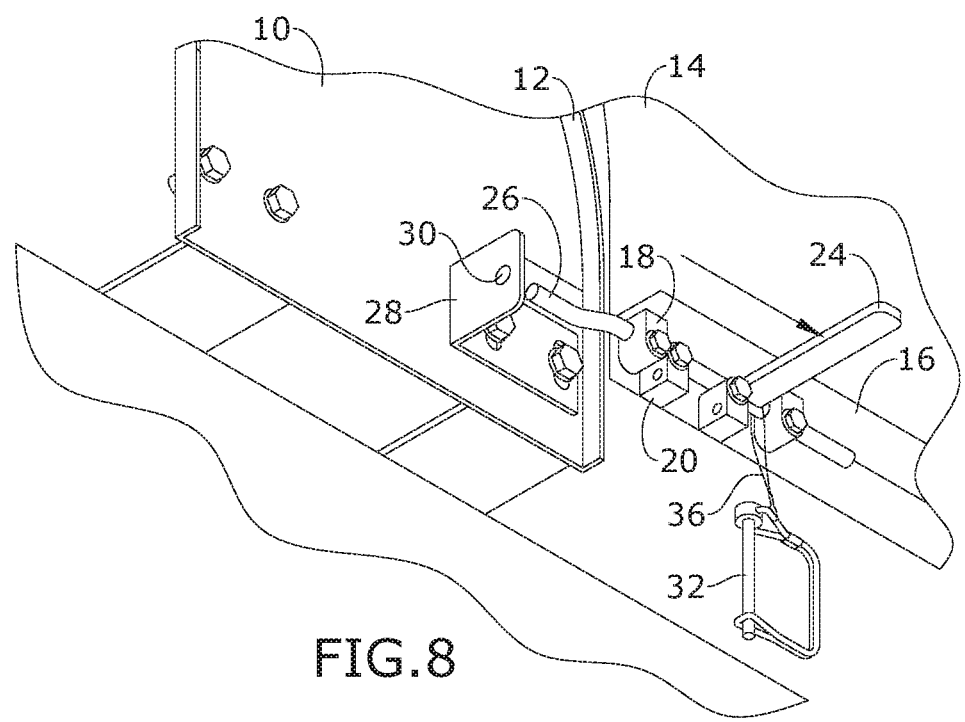
FIG. 8 is a detail bottom perspective view of an exemplary embodiment of the present invention, illustrating the sliding out of z-bolt 22.
Figure 9:
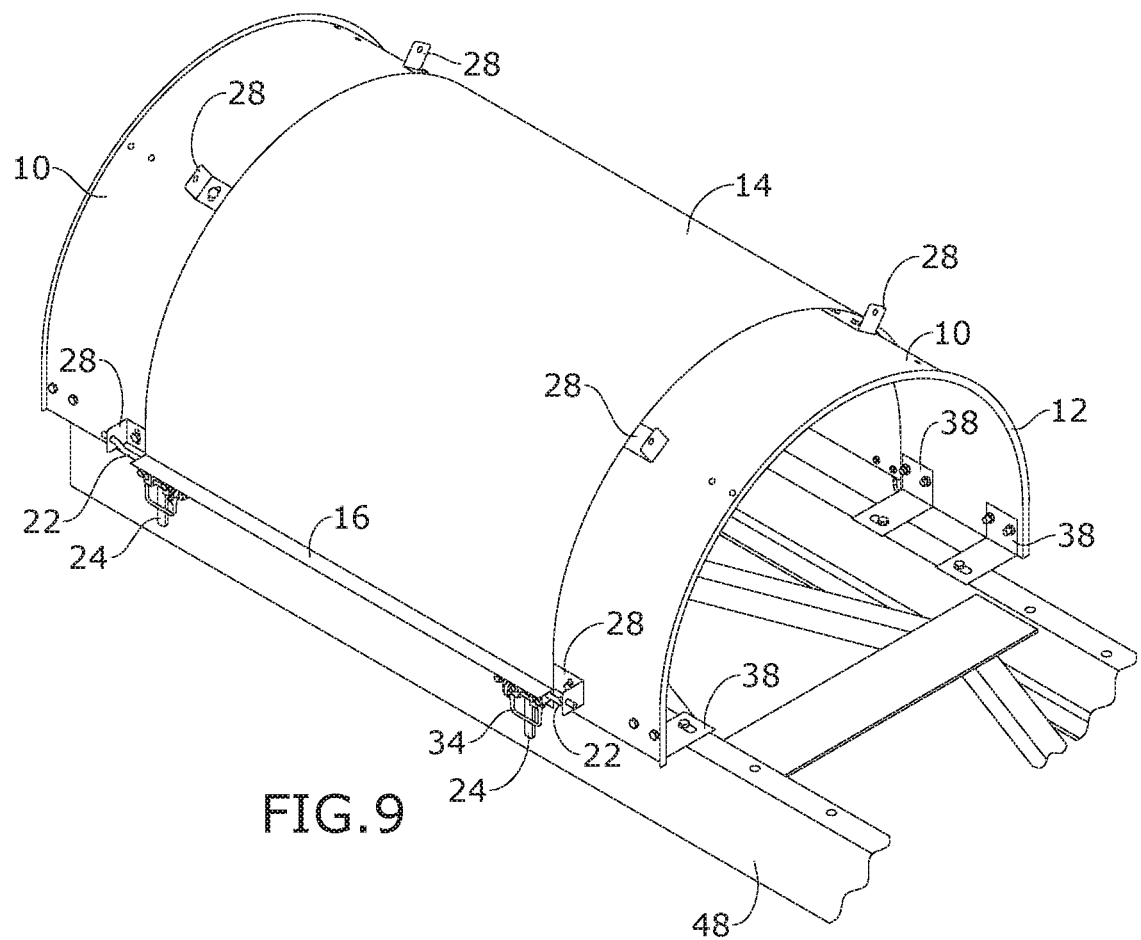
FIG. 9 is a perspective view of an exemplary embodiment of the present invention, illustrating the access from either side.

Thus, on one side of the arcuate hood 14 the corner lock assemblies 200 can be in secured/locked positions, while the lock assemblies 200 on the other side of the arcuate hood 14 can be in the unlocked position for opening that side of the arcuate hood 14. These lock assemblies 200 of the open side may be locked to other attachment points/z-bolt receiving holes 30 of other latch brackets 28, as illustrated in FIG. 2. Thereby, the user can secure/lock the arcuate hood 14 in the open position by way of the lock assemblies 200 that were moved to the unlocked position in the first place, for extending time during an inspection or maintenance.

The cam z-bolt latches 22 allow for the arcuate hood 14 to be opened and closed without the use of tools by using the sliding action of the cam z-bolt latches 22 through the z-bolt post holes that allows for the cam z-bolt latches 22 to function as a latch and also as a hinge in the locked position which allows for the arcuate hood 14 to be opened and closed on either side without tools. The cam z-bolt latches 22 allow for all the parts to work together so that it can hinge and also the cam z-bolt latches 22 create the correct tension while sealing against the arcuate longitudinal ridges 12 based on their Z-shape of the bolt latch pin 26 relative to the body of the cam z-bolt 22.

A method of using the present invention may include the following. The cover hood assembly 100 disclosed above may be provided. A user can remove the clevis pins 32 to the unsecured position and then rotate the bolt arm 24 and slide the cam z-bolt latches 22 to the unlocked position, but still supported by the z-bolt receiving posts. Then the user may raise/pivot the arcuate hood 14 to the open position and slide the cam z-bolt latches 22 back into attachment points 30 of upper receiver latch brackets 28 into the locked position, and insert the clevis pin 32. In the open position a user may access the conveyor equipment 50 (such as the conveyor idler) or material on the conveyor. Once the user has completed the operation that required opening the arcuate hood 14, it can be moved to the closed position by reversing the opening steps. The present invention allows for inspection and maintenance of what is in or on the mounting surface without the aid of tools and can be opened from either side. Often this operation is done at heights and if tooling were required the tools can be dropped which would extend the process. Additionally, the present invention can be employed for general guards and covers for practically anything that requires it.

It should be understood, of course, that the foregoing relates to exemplary embodiments of the invention and that modifications may be made without departing from the spirit and scope of the invention as set forth in the following claims.

What is claimed is:
1. A cover hood assembly, comprising:
two spaced apart arcuate frames;
each arcuate frame having a circumferential ridge facing the other circumferential ridge;
a plurality of attachment points spaced apart along a circumference of each arcuate frame just inward of the circumferential ridge;
an arcuate hood having a greater radius than a radius of each arcuate frame;

a cover lock assembly attached to each corner of the arcuate hood; and each cover lock assembly having a cam bolt latch engaged with two spaced apart bolt posts, the two spaced apart bolt posts attached to the corner so that the cam bolt latch is movable between an unlocked position and a locked position engaging an adjacent attachment point of the plurality of attachment points.

2. The cover hood assembly of claim 1, further comprising a bolt arm extending from a bolt body of the cam bolt latch;

the cam bolt latch rotatable within the engaged two spaced apart bolt posts so that the bolt arm is rotatable between a secured and unsecured position.

3. The cover hood assembly of claim 2, further comprising:

for each cover lock assembly:

two spaced apart clevis posts between the two spaced apart bolt posts so as to be below said bolt body; and a clevis removably interconnecting the two spaced apart clevis posts for preventing the bolt arm from rotating between the secured and unsecured position.

4. The cover hood assembly of claim 3, further comprising a Z-shaped pin extending from each bolt body, the Z-shaped pin engaging the adjacent attachment point of the plurality of attachment points in the locked position, wherein said adjacent attachment is spaced away from the arcuate hood a distance farther than a distal boundary of the circumferential ridge, and wherein the bolt body generally abuts said distal boundary when the bolt arm is in the secured position.

5. The cover hood assembly of claim 4, further comprising a handle attached to each longitudinal edge of the arcuate hood.

6. The cover hood assembly of claim 4, wherein the arcuate hood is pivotably engaged relative to each cover lock assembly in the locked position.

7. The cover hood assembly of claim 4, wherein in the unlocked position the Z-shaped pin prevents the cam bolt latch from sliding past the circumferential ridge.

\* \* \* \* \*